United States Patent [19]

Crabtree et al.

[11] Patent Number: 4,702,617

[45] Date of Patent: Oct. 27, 1987

[54] CHILL TEMPERATURE METER WITH SELECTABLE RESPONSE

[76] Inventors: Austin A. Crabtree, Rte. 4, Box 265; James R. Crabtree, Rte. 4, Box 254; Jeffrey Crabtree, Rte. 4, Box 318, all of Rockwood, Tenn. 37854

[21] Appl. No.: 838,284

[22] Filed: Mar. 10, 1986

[51] Int. Cl.[4] .......................... G01K 3/00; G06F 15/20
[52] U.S. Cl. .................................. 374/109; 364/557; 364/734
[58] Field of Search ................ 374/109, 170; 364/565, 364/575

[56] References Cited

U.S. PATENT DOCUMENTS

| | | | |
|---|---|---|---|
| 3,296,530 | 1/1967 | Brooks | 324/122 |
| 3,954,007 | 5/1976 | Harrigan | 374/109 |
| 4,137,568 | 1/1979 | Dlugos | 364/734 |
| 4,403,296 | 9/1983 | Prosky | 374/109 X |
| 4,504,157 | 3/1985 | Crabtree et al. | 374/109 |
| 4,602,344 | 7/1986 | Ferretti et al. | 364/575 X |
| 4,606,009 | 8/1986 | Wiesmann | 364/734 X |

Primary Examiner—Daniel M. Yasich
Attorney, Agent, or Firm—Pitts and Brittian

[57] ABSTRACT

A meter for determining chill temperature and/or comfort index. This meter utilizes a composite sensor that is responsive to the environmental factors that produce a chill temperature as perceived by a person in that environment. Specifically, the sensor is responsive to the combined effects of wind velocity, real temperature, solar radiation and humidity. In the most general embodiment, the output signal from the sensor is fed to a programmed microprocessor wherein that signal is repetitively sampled, averaged and converted to an appropriate signal so as to be appropriately displayed. In order to prevent adverse affects upon the average by spurious large signals, the microprocessor is programmed to limit any sample signal to a value that differs from the average by only a selected amount. The normal signal from the sensor is proportional to the square root of the power, and the microprocessor first squares that signal prior to the averaging step. Since the sensor produces an analog signal, and the microprocessor uses digital signals, an analog-to-digital converter is used. In those instances where it is desired to accentuate the effect of a specific environmental factor, a complimentary sensor for that factor is used to produce a modification of the average value and thus cause the generation of a selected response for the meter.

9 Claims, 2 Drawing Figures

CHILL TEMPERATURE METER WITH SELECTABLE RESPONSE

DESCRIPTION

TECHNICAL FIELD

This invention relates generally to a device to measure the comfort, or discomfort, of a person in the environment during winter or summer, and more particularly to a meter for determining and producing an output reading of the chill temperature or chill factor to be experienced by such person. The meter takes into account real temperature, wind velocity, moisture content and solar effects. Furthermore, any of these components can be weighted to give a selected modification over any portion of the response of the meter.

BACKGROUND ART

A considerable discussion of the matter of human comfort as affected by the conditions of the environment is set forth in our U.S. Pat. No. 4,504,157, issued on Mar. 12, 1985. Described therein is a composite sensor, and a circuit for the same, that takes into account real temperature, wind velocity, moisture content (humidity), and solar effects in the determination of chill temperature or chill factor. This can be generally referred to as a "comfort index". The content of that patent is incorporated herein by reference. Basically, the principle of that composite sensor is the determination of the amount of power that is required to maintain a given temperature (or temperature differential) within the sensor as that temperature, or temperature differential, is affected by the environmental variables. An output signal, in the form of a voltage, is related to the chill temperature produced by those variables.

In order to obtain the output voltage from the circuit shown in the patent, a signal related to the square root of the power is squared within a "power meter" circuit. Although this manner of obtaining the output signal is generally satisfactory, some drift has been observed in long-term operations of the circuit.

It is recognized that there are applications for a chill temperature system wherein special "weighting" of the influence of one or more of the four variables may be desirable either over a wide or narrow range of the chill temperature value. For example, it may be desirable to select a response that is particularly affected by humidity, temperature, wind velocity or solar effects. This special response might be desired, for example, to produce a readout of the chill temperature having a relationship that more closely follows the relationships that have been established by prior art instruments or by human response. Also, for certain research studies, it may be desirable to give greater weight to one of these effects than can be achieved through the use of the composite sensor alone.

Accordingly, it is a primary object of the present invention to provide a chill temperature meter that provides an output that is more truly a measure of the comfort index than has been possible using devices of the prior art.

It is another object of the present invention to provide a chill temperature meter that automatically samples and averages the output signal from a composite sensor and discriminates against those sample signals that appear to deviate in an amount greater than a selected value from the average in order to eliminate possibly spurious information.

It is a further object of the present invention to provide a chill temperature meter system wherein the contribution of one or more of the major variables affecting the index can be weighted in selected regions of response to give a selected control of the output information.

These and other objects of the present invention will become apparent upon a consideration of the description given hereinafter as referenced to the drawing.

DISCLOSURE OF THE INVENTION

In accordance with the present invention, a chill temperature meter system is provided whereby an output signal is derived that is related to the comfort of an individual and more specifically to the chill temperature (comfort index) experienced by that individual. In addition, the output signal can be selectively weighted by one or more of the variables influencing the chill temperature when such is desired. The meter includes a composite sensor that is affected by real temperature, solar effects, moisture content and wind velocity. The output signal of this composite sensor is converted to digital form, sampled, averaged and displayed in digital format. In the course of the periodic sampling of the output signal from the composite sensor, apparently spurious signals that deviate more than a selected amount from the average are effectively discounted. The processing of the composite sensor output in this manner is achieved by a properly programmed microprocessor. In order to achieve a desired weighting of one of the components affecting the chill temperature, a complimentary sensor is provided that is responsive to that one component, with an output signal from that complimentary sensor being processed in the microprocessor to affect the final output in the selected manner as defined in the program.

BEST MODE FOR CARRYING OUT THE INVENTION

Figure 1:
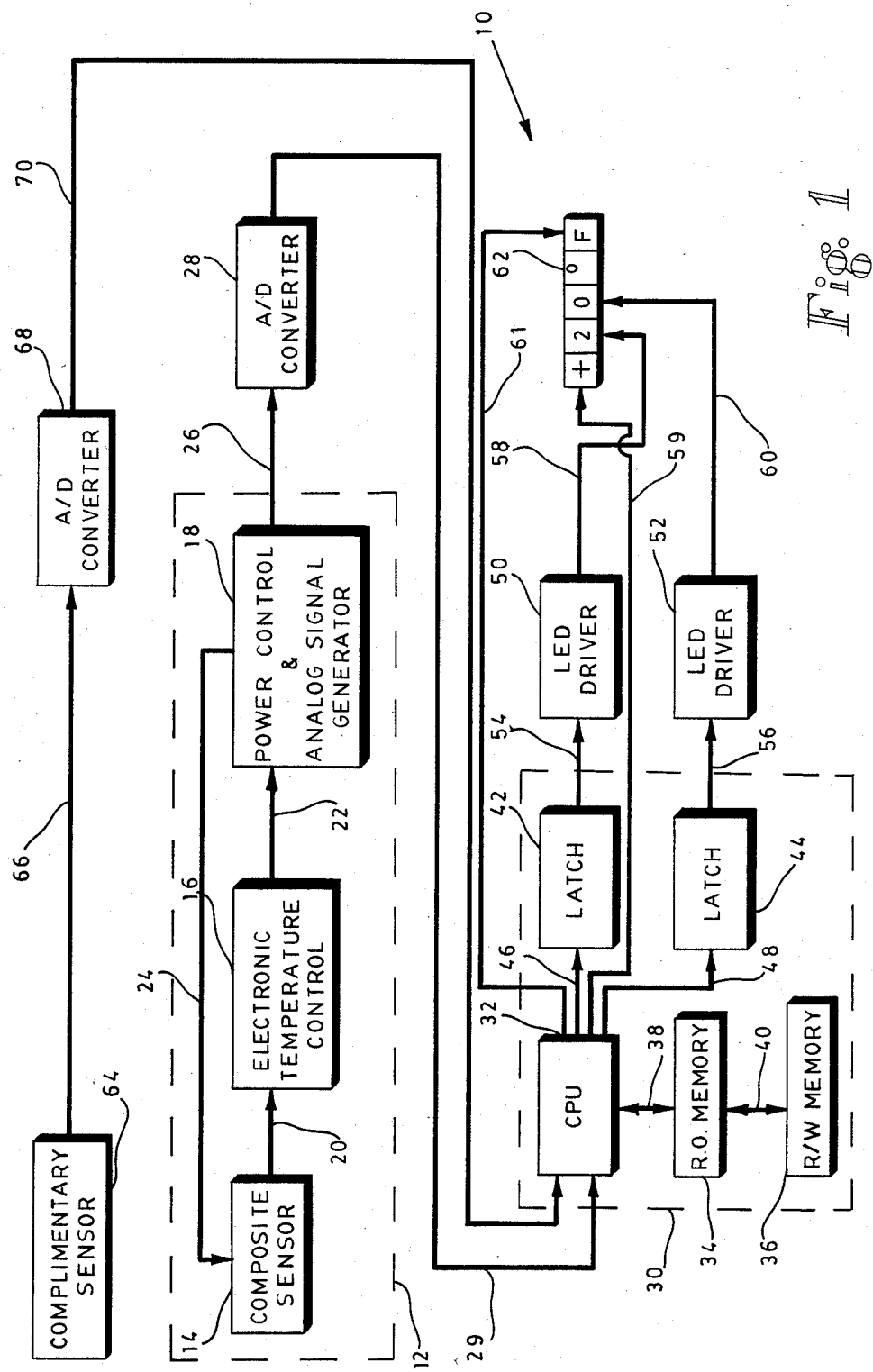
FIG. 1 is a block diagram of the circuit of the present invention. A portion is defined that is essentially the circuit of above-cited U.S. Pat. No. 4,504,157, as well as the components that define the microprocessor of the invention.
Figure 2:
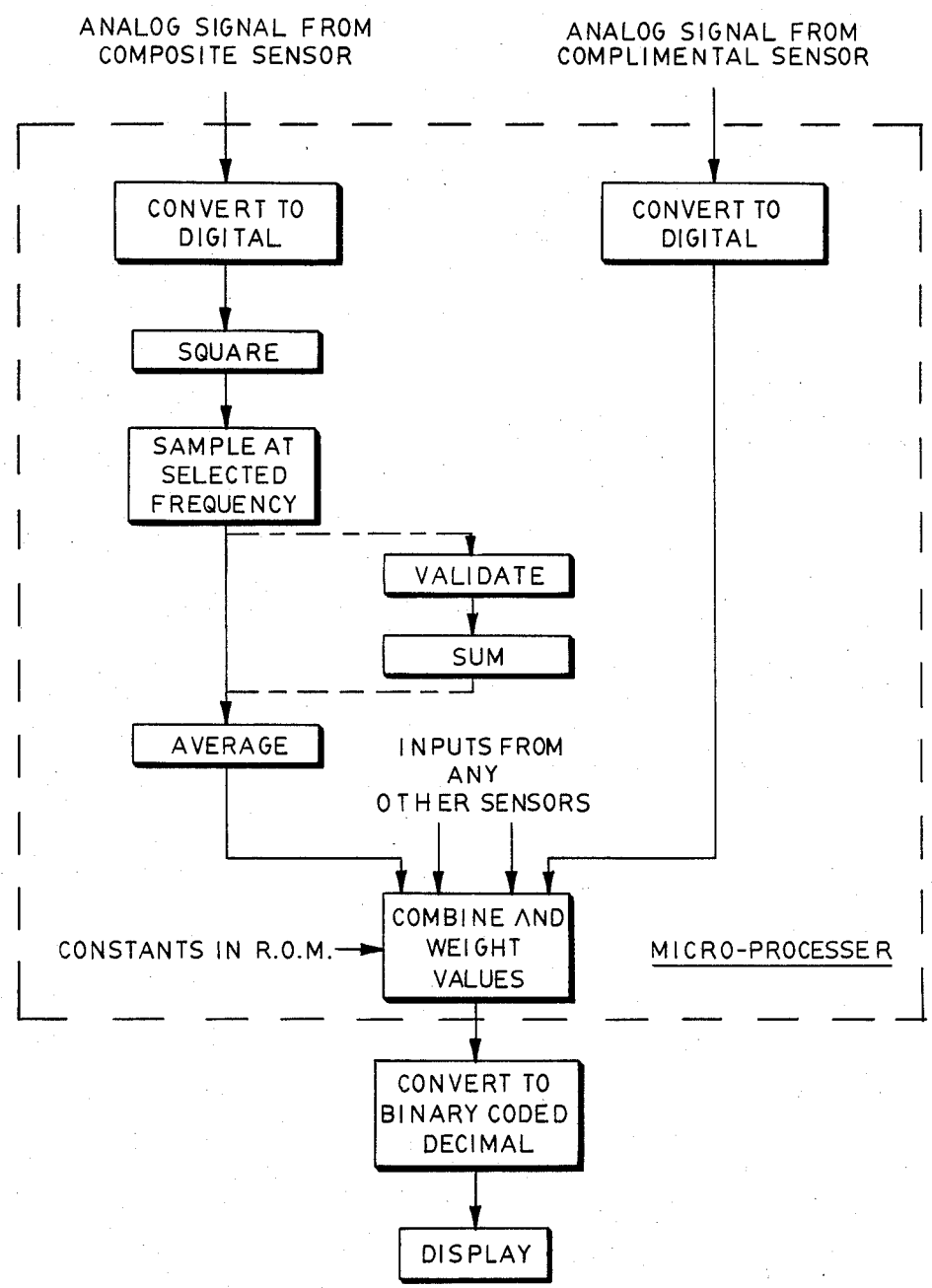
FIG. 2 is a diagram indicating the steps, i.e., the flow chart, of the sequence of operations performed by the present invention.

Referring now to the block diagram of FIG. 1, shown generally at 10 therein is the present invention. Designated by the dashed area 12 is a major portion of the invention described in more detail in above-cited U.S. Pat. No. 4,504,157, the teaching of which, as stated above, is incorporated herein by reference. This portion 12 includes a composite sensor 14 which is subjected to the environmental effects of wind velocity, humidity, real temperature and solar radiation, and results in a signal that is related to all of these effects. Also included is an electronic temperature control 16 and a power control and analog signal generator unit 18. These components are interconnected by leads 20, 22, and 24. The function of these components will be fully understood upon a review of that patent.

The output signal on lead 26, being an analog signal, is converted to a digital signal in analog-to-digital converter 28 for inputting via lead 29 to a microprocessor (a high speed signal processor means) indicated by the dashed line 30. This microprocessor 30 contains conventional components as will be known by persons skilled in the art. More specifically, there is a central processing unit (CPU) 32, a programable read-only (R/O) memory 34 for the storage of a control program and a read-write (R/W) memory 36 for the storage of data. These memory units 34, 36 are shown connected to the CPU 32 by leads 38, 40. The microprocessor also includes a pair of latch units 42, 44 connected to the CPU by leads 46, 48; these latch units are used, in this embodiment, for driving a pair of LED drivers 50, 52 via leads 54 and 56. These drivers are connected through leads 58, 60 to a digital readout unit 62 where the chill factor is displayed in degrees (C. or F., and + or −). Signals from the CPU 32 for the sign of the chill factor to the readout unit 62 are conveyed via lead 59. Furthermore, since a user of the device can choose a readout in Centigrade or Fahrenheit, a signal indicating this choice is conveyed from the CPU to the readout unit 62 via lead 61. The connections within the digital readout unit 62 will be known to those versed in the art. In some applications, a recording instrument can be substituted for, or supplement, the type of display illustrated. It will be understood that although the various leads connecting the components are shown as a single lead in FIG. 1, most units are interconnected by a plurality of leads as will be known by one skilled in the art.

All of the components referred to above from the A/D converter to the readout unit can be commercially available integrated circuit chips. For example, the A/D converter 28 typically is model ADC-0808 manufactured by National Semiconductor Corporation (NSC) P.O. Box 58090, Santa Clara, California 95052. The CPU 32 is typically model 8085 manufactured by Intel Corporation 3065 Bowers Avenue, Santa Clara, Calif. 95051 and the memory units 34, 36 are typically models 2716 and 6116P, respectively, as manufactured by Intel Corporation. The latch units 42, 44 are typically models DM75 manufactured by NSC, the LED drivers are typically model DM54 and NSC, and the readout unit 62 is typically model P348 manufactured by Panasonic, Inc. (Matsushita Electronics Corporation) 1 Kotari-Yakemachi, Nagaokakyo, Kyoto 617 Japan.

As illustrated in FIG. 1, an operating program stored in the R/O memory 34, which program would be known or developed by a person skilled in the art, after a determination of the functions to be performed, causes an incoming digital signal from the A/D converter 28 to be first squared. This is necessary since the output from the signal generator 18 (according to U.S. Pat. No. 4,504,157) is the square root of the power supplied to the composite sensor 14. Furthermore, the CPU is directed to sample the input signal at a selected frequency. This can be, for example, a sample every thirty-six seconds. Selected numbers of the samples, for example one hundred in a period of one hour, are averaged in order to minimize random fluctuations. In addition, the program can be designed for (and preferably includes) setting a limit on any signal that deviates from the average by more than a selected amount. Typically, a signal corresponding to more than a 1.5 to 2 degree variance from the average is considered to be spurious. This step "validates" the signal to preserve the integrity of the average by preventing spurious large signals from overweighting the average unduly by one sample. The positive and negative deviations of any sample are summed and stored in separate registers, and these sums are used to continuously update the average. This current average is converted to binary coded decimal signals and then into a seven segment code needed for illuminating a particular digit to be displayed in the readout unit 62. In all of the computations prior to the calculation of the average, the CPU operates with sixteen-bit numbers (four digits). Then for calculation of the average, the program directs the dropping of the last two digits in order to be in proper format for the display. In this manner, the output signal to the latches and drivers is in proper format for the display of the chill temperature.

It will be recognized by those versed in that art that the program can be modified to cause the CPU to perform more or less operations with the signal data than those described above. The operations set forth above are considered to be the most viable for achieving a desired result with the present invention. Through the use of a conventional program generator, a program can be prepared to produce a desired result.

The normal output result of the composite sensor portion 12 has a certain mathematical exactness. However, there may be instances where the output needs to reflect, for example, a humanistic response. This modification to reflect some special type of response is referred to as "accent sensing". For example, the effect of humidity upon comfort, as sensed by a person, is particularly important in the range of temperature of about twenty (20) to forty (40) degrees Fahrenheit. However, the composite sensor is generally less responsive to humdity than to the other environmental effects. Thus, it may be desirable to alter the response of the chill temperature meter to obtain greater sensitivity (a modified chill temperature) in that range.

This alteration or modification can be accomplished, as illustrated in FIG. 1, through the use of a complimentary sensor 64 that provides a signal related to the humidity. This complimentary sensor can be any one of those known to those versed in the art, and the output thereof passes on lead 66 to an analog-to-digital converter 68. This converter, in turn, is connected into a second input of the CPU 32 such that the program in the memory 34 can use this secondary signal to perform the modification of the signal otherwise derived from the composite sensor 14. It should be pointed out that the complimentary sensor 64 is chosen to respond to whatever variable of the chill temperature factors that is desired. In applications of the present invention when the solar radiation is particularly controlling within certain ranges, the complimentary sensor would be one for sensing the solar radiation. Furthermore, more than one complimentary sensor can be used depending upon the desired selected modification. Thus, a professional working in any specific area of research can select the type and shape of response as displayed. This modified response can be, for example, that to match data obtained by other means so that the data are compatable.

From the foregoing, it will be recognized that an improved meter system has been provided for determining and displaying a value of chill temperature or comfort index. It is, of course, understood that although preferred embodiments of the present invention have been illustrated and described, various modifications thereof will become apparent to those versed in the art. For example, although the data processing portion of the invention (the microprocessor) has been described as deriving signals from the composite sensor unit of U.S. Pat. No. 4,504,157, another composite sensor that is responsive to the cited environmental factors can be utilized within the scope of the invention.

Accordingly, the scope of the invention should be defined only by the appended claims and their equivalents when read together with the detailed description.

We claim:

1. A chill temperature meter with selectable response for determining and displaying a number corresponding to said chill temperature, which comprises:

a composite sensor that is responsive to prevailing composite environmental factors of wind velocity, real temperature, humidity, and solar radiation, said sensor provided with a temperature-controlled element maintained at a selected temperature, said sensor providing an analog output signal related to electrical power required to maintain said selected temperature that is related to the composite effects of said environmental factors;

an analog-to-digital converter means for converting said analog output signal of said composite sensor into a first digital signal;

at least one complimentary sensor adapted to sense one of said enviornmental factors, said complimentary sensor providing an analog signal related to said factor;

further analog-to-digital converter means for producing a second digital signal derived from said analog signal of said complimentary sensor;

high speed signal processor means for periodically taking samples of said first digital signal, for producing an average signal of said samples of said first digital signal, for selectively modifying said average signal by said second digital signal using a pre-selected response relationship, and for producing a binary coded decimal output signal corresponding to said modified average signal of said samples;

circuit means for converting said binary coded decimal output signals into a seven segment code; and display means responsive to said seven segment code for displaying a digital number corresponding to said chill temperature.

2. The meter of claim 1 wherein said signal processor means further limits any individual sample of said first digital signal to a valur no greater than a selected value different from said average signal.

3. The meter of claim 1 wherein said analog signal from said composite sensor is proportional to the square root of said electrical power required to maintain said selected temperature of said temperature-controlled element, and wherein said processor means squares said digital signal prior to said sampling and averaging.

4. The meter of claim 1 further comprising:

at least one complimentary sensor adapted to sense one of said environmental factors, said complimentary sensor providing an analog signal related to said factor;

further signal conditioning means for producing a second digital signal derived from said analog signal of said complimentary sensor; and wherein said processor means selectively modifies said sample average in relationship to said second digital signal from said complimentary sensor.

5. A chill temperature meter with selectable response for determining and displaying a number corresponding to the comfort index of a person in a selected environment, which comprises:

a composite sensor that is responsive to a composite of environment factors of wind velocity, real temperature, solar radiation, and humidity in said environment, said composite sensor having a temperature-controlled element;

circuit means for providing electrical power to said temperature-controlled element to maintain a selected temperature, for determining the quantity of power required to maintain said selected temperature and to produce an an analog signal related to the square root of said required power;

at least one complimentary sensor that is responsive to one of said environmental factors, said complimentary sensor providing an analog output signal related to the sensing of said one factor;

analog-to-digital circuit means for individually converting said analog signal from said composite sensor and said analog signal from said complimentary sensor into first and second digital signals, respectively;

high speed signal processor means for receiving said first and second digital signals, for sampling and for producing an average signal of said first digital signal and for producing a preselected modified signal of said average signal in relationship to said second digital, said signal proceasor means further producing a binary coded decimal output signal derived from said modified average signal;

circuit means for converting said binary coded decimal output signal into a seven segment code for illuminating a digital display; and a digital display responsive to said seven segment code for producing digital numbers, said numbers corresponding to said chill temperature.

6. The meter of claim 5 wherein said processor means further limits any individual sample of said first digital signal to a value no greater than a selected value different from said average.

7. A chill temperature meter with a selectable response to environmental factors for determining and displaying a number corresponding to said chill temperature, which comprises:

a composite sensor system that is responsive to prevailing composite environmental factors of wind velocity, real temperature, humidity, and solar radiation, said composite sensor system providing a first digital output signal related to said composite environmental factors;

at least one complimentary sensor system that is responsive to a selected one of said environmental factors, said complimentary sensor system providing a second digital output signal related to said selected environmental factor;

a microprocessor means for receiving said first and second digital signals, said microprocessor having a preselected program for sampling said first digital signal, for producing an average signal of said first digital signal, and for modifying said average signal in relationship to said second digital signal according to said program, said microprocessor means further producing a binary coded decimal output signal derived from said modified average signal;

circuit means for converting said binary oded decimal output signal into a seven segment code for illuminating a digital display; and digital display responsive to said seven segment code for producing digital numbers, said numbers corresponding to said chill temperature.

8. The meter of claim 7 wherein said complimentary sensor is responsive to humidity, and said program causes said average signal to be modified over a selected temperature range by said second digital signal to obtain increased sensitivity to humidity of said meter over said temperature range.

9. The meter of claim 7 wherein a plurality of complimentary sensor systems are utilized to each produce an output digital signal corresponding to a different one said environmental factors, and wherein said microprocesser means modifies said average signal using said output digital signals from said plurality of complimentary sensor systems to produce a chill temperature corresponding to a preselected response relationship to said environmental factors.

* * * * *